April 12, 1927.  H. A. ESSMANN  1,624,588
WEIGHING SCALE
Filed Dec. 7. 1925  3 Sheets-Sheet 1
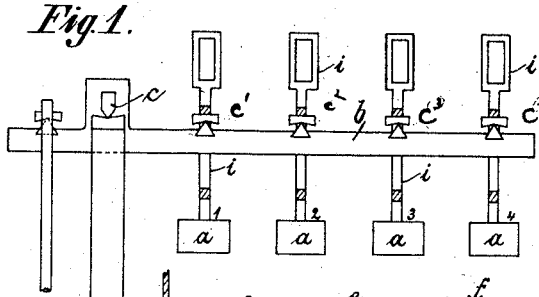
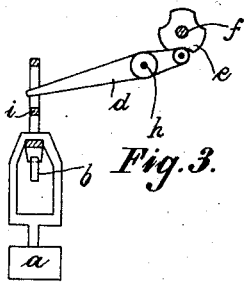
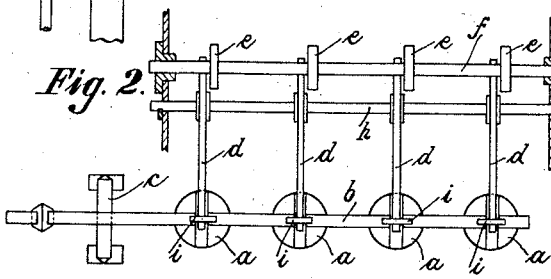
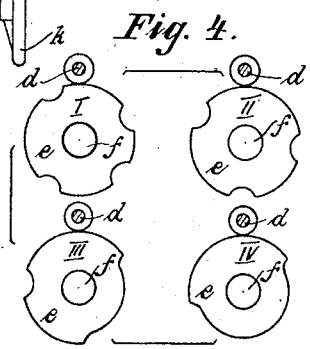
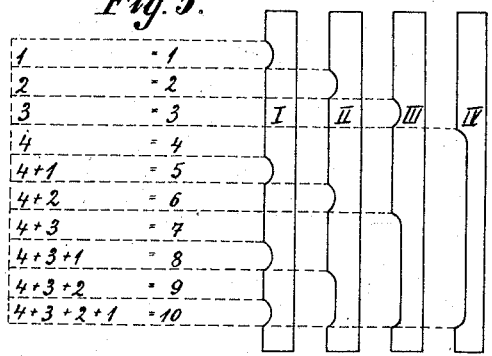
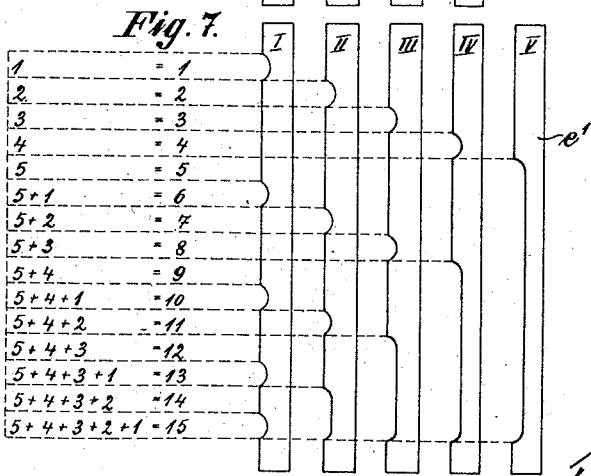
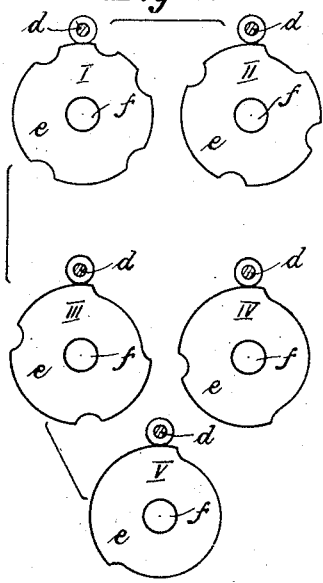
Inventor
H. A. Essmann April 12, 1927.

H. A. ESSMANN

WEIGHING SCALE

Filed Dec. 7. 1925      3 Sheets-Sheet 2

Inventor
H. A. Essmann
by
Langner, Parry,
Card & Langner
Att'ys

April 12, 1927.

H. A. ESSMANN

WEIGHING SCALE

Filed Dec. 7, 1925      3 Sheets-Sheet 3

Inventor
H. A. Essmann
by
Langner Parry Card & Langner
Attys.

Patented Apr. 12, 1927.

1,624,588

UNITED STATES PATENT OFFICE.

HEINRICH AUGUST ESSMANN, OF ALTONA-OTTENSEN, GERMANY, ASSIGNOR TO THE FIRM OTTENSENER WAAGENFABRIK ALBERT ESSMANN & CO., OF ALTONA-OTTENSEN, GERMANY.

WEIGHING SCALE.

Application filed December 7, 1925, Serial No. 73,848, and in Germany December 19, 1924.

Weighing scales having a number of settable or liftable weights (hereinafter called set weights) are known in which for every denominator of the decimal system (or the like) there is a series of weights comprising a number (ten) of equally heavy settable weights. These series or groups of weights engage the lever or beam at different places, and the weights can be set one after the other. Since with scales of this description every different loading by set weights will be obtained only by consecutively setting or lifting the weights one after the other in uninterrupted series a considerable number of set weights are necessary, thus when there are four denominations (units, tens, hundreds, thousands) forty (four times ten) set weights are required. The large number of set weights is the cause of the further drawbacks of this kind of scales.

In the scale constructed according to the present invention the efficiency of the known scales will be secured with a considerably smaller number of set weights. For every denomination of the decimal system the ten weighing stages are secured with only four weights, which are (preferably) equally heavy, so that with four denominations the scale has only sixteen (four times four) set weights. To obtain the ten weighing stages having only four set weights in very denomination, the set weights are arranged removably or loosely on the corresponding arm of the four beam-arms rigidly connected with one another at such distances from the support of the beam, that with the various leverages of the set weights the ten weighing stages can be secured by suitably setting and lifting off of the set weights. The setting and lifting of the weight is carried out by a controlling or adjusting device for the four denominations each.

The scale constructed according to the present invention therefore differs from the known scale in that the set weights of each of the denominations take effect at various distances from the support of the scale beam, that is to say with different leverages, while in the known scale all set weights of each denomination take effect at the same distance from the support of the scale beam, thus acting with the same leverage on the scale beam.

The invention moreover has for its object a simplification of the scale and to provide means for a further reduction in the number of weights while maintaining the same efficiency of weighing as will be fully understood from below.

In the drawings,

Figs. 1, 2 and 3 are respectively side, plan, and end views of a scale weighing in terms of one denomination only.

Fig. 4 is an end elevation showing a plurality of shafts $f$ with associated discs for a scale weighing in terms of four denominations.

Fig. 5 is a diagrammatical view of circumferential developments of the discs shown in Fig. 4 and a table showing weighing stages corresponding to the relative weight positions.

Figs. 6 and 7 are views similar to those in Figs. 4 and 5 respectively, referring to a scale weighing in terms of five denominations.

Figure 14:
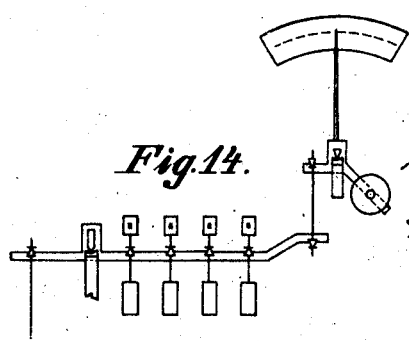
Figure 12:
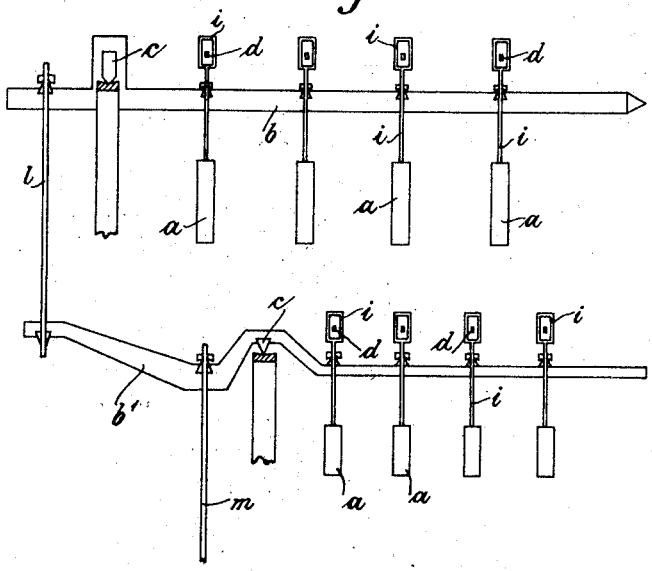
Figure 13:
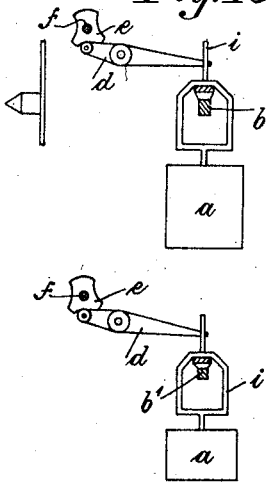

Figs. 12, 13 and 14 are side elevations illustrating other alternative arrangements In Figures 1 to 3 for sake of simplicity a construction of a scale is shown for only one denomination, say the units. The beam $b$ of the scale therefore has only one single arm on which equally heavy weights $a$ are set. For a plurality of denominations a corresponding number of arms are provided which are rigidly connected with one another in front of the beam supporting knife edge $c$. The weights $a$ can be set with their hangers $i$ on four knife edges arranged on the beam. The distances of these four knife edges $c'$, $c^2$, $c^3$, $c^4$ from the supporting knife edge $c$ are such that the leverages of the weights with reference to the supporting knife edge $c$ are in proportion of 1:2:3:4. Therefore the weights act on the beam $b$ with a momentum of weight of for instance 1 kg. 2 kg. 3 kg. 4 kg. The weights $a$ are set and lifted off by four two-armed levers $d$ rotatably mounted on the rod $h$ and adapted to engage with one arm in the upper frame like end of the hanger $i$ of the weights and with the other arm bears against a circular cam disk $e$ having gaps on its periphery.

Four such disks are firmly mounted on a shaft $f$ provided at one end with a handwheel $k$. When the levers $d$ with their free ends enter a gap of their disks $e$ the weights $a$ are dropped to be set on the beam $b$. The position of the gaps of four disks $e$ will be understood from Figures 4 and 5, Figure 5 illustrating the wound off periphery of the disks, the Roman numbers indicating the corresponding disks. The right hand vertical row of Arabic numbers indicate the ten weighing stages obtained by the four drop or set weights. From the lefthand row of numbers it may be gathered by which single or more set weights these weighing stages are obtained. From the position of the single numbers of the righthand row of numbers with regard to the wound off peripheries it will be seen, at which parts of the peripheries of the disks for every weighing stage the levers $d$ enter a gap which thereby sets the corresponding weight $a$ on the beam.

For the weighing stage 3 only the disk III operates on the corresponding lever $d$ by a gap, thus three weights $a$ are moved by a gap in the three disks I, III and IV of the corresponding levers $d$, resulting in the momenta of 4 kg. 3 kg. and 1 kg.

In order to allow one of the eight weighing stages to operate the disks $e$ are rotated by the handwheel $k$ at a suitable angle, whereby the gaps permit a setting and lifting of the weights until the respective gaps permit those weights to be set, which are necessary for the desired weighing stage.

Instead of disks $e$, if so desired, straight rails may be used which are attached to a slidably guided plate parallel to one another and provided with gaps on a free edge. Such rails may have a shape as shown in Figure 5.

For more denominations (tens, hundreds, thousands) the scale beam will be connected rigidly with further (three) arms $b$ and correspondingly heavier weights $a$ and controlling or adjusting means will be provided consisting of disks $e$ and levers $d$, one of which for each weight.

When five set weights $a$ are used on an arm $b$ the momenta of these weights will be in a ratio of $1:2:3:4:5$. The shape of the disks and the diagram of adjustment will be understood from the Figures 6 and 7. In this instance fifteen weighing stages are possible the greatest weighing momentum amounting to 15 (kg.), which may be derived from the addition of the single momenta of five weights ($5+4+3+2+1$). An arrangement of this kind is well adapted for scales having weighing efficiency for instance up to 1500 kg. since in such case an arm $b$ for a higher denomination (the thousands) and the corresponding controlling device can be spared. This will be secured solely by the addition of the fifth set weight having the greater weighing momentum.

Figure 9:
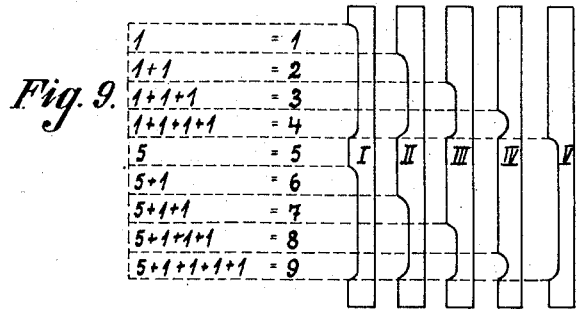
Figs. 8 and 9 are views similar respectively to those of Figs. 6 and 7 showing a modification of the invention.
Figure 8:
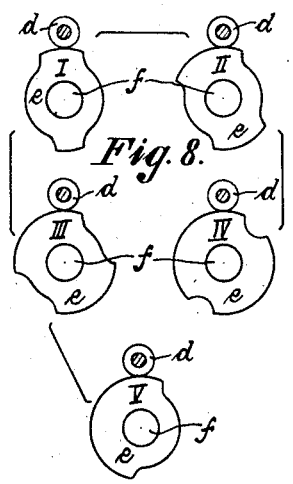

Other graduations of weighing momenta are possible. Thus for instance on one arm $b$ four weights of equal momenta say 1 (kg.) and a fifth weight having a momentum of 5 (kg.) may be arranged. Such an arrangement is indicated in Figures 8 and 9, the construction of five disks $e$ and the corresponding diagram.

For the sake of saving room the set weights $a$ belonging to denominations following in pairs may be arranged on one and the same arm $b$ following alternatively on one another. With four denominations the scale beam need then be provided only with two arms $b$ rigidly connected with one another. A controlling device $f$, $e$, $d$ would then be arranged on each side of each arm $b$, one being adapted to lower and raise the weights $a$ of one denomination and the other the weights $a$ of the other denomination. Such an arrangement with regard to one single arm may be gathered from Figures 10 and 11.

Figure 10:
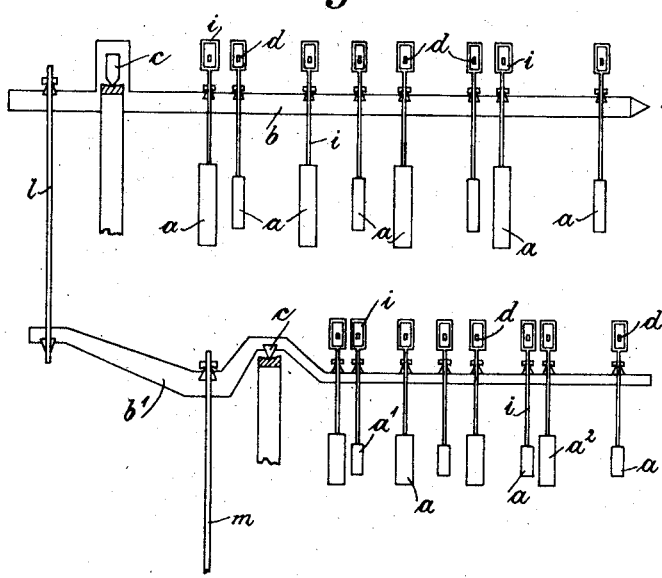
Figs. 10 and 11 are side and end views of another modified arrangement.
Figure 11:
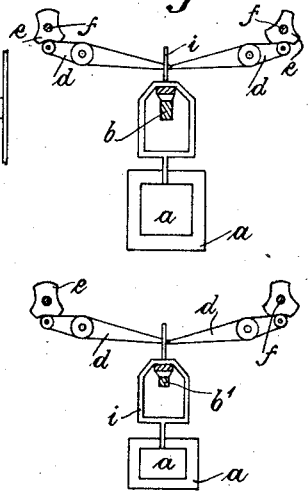

In the Figures 10 and 11 another improvement is made use of. Since the denominations of the decimal system are graduated at the ratio of $1:10:100:1000$ etc. with a single weighing beam having four arms $b$ rigidly connected with one another or as in the last described modification two arms $b$ rigidly connected with one another, the great difference of weight between the set weights for the units and the set weights for the thousands would require unfavorable small unit-set weights and very large thousand-set weights. In order to avoid too light and too heavy set weights, a plurality of weighing beams are arranged one behind the other, whereby the set weights of the lower denominations (units, tens) are arranged on the weighing beam of the lower ratio those of the higher denominations (hundreds, thousands) on the weighing beam of the higher ratio. Since in Figures 10 and 11 the set weights of two denominations following one another are arranged on one arm $b$ only two weighing beams are disposed one behind the other. The two weighing beams $b$, $b'$ are connected by a rod or hanger $l$ in such manner, that the correct ratio of these two beams with regard to the force to be transmitted by the rod $m$ leading from the weighing beam $b'$ to the load bowl or the like is upheld. On the upper beam of the higher ratio are arranged the set weights for the two higher denominations (thousands, hundreds) following one another alternatively, while on the lower weighing beam $b'$ the set weights for the two lower denominations (tens, units) are disposed following one another alternatively.

Figures 12 and 13 show a simplified form of the construction of Figures 10 and 11.

In Fig. 14 a connection of the scale with an inclination scale is illustrated according to the invention.

I claim:—

1. In a weighing scale, a weighing beam supported on a knife edge, a series of weights arranged to be set on the weighing beam at prescribed distances from the knife edge of the beam, means to set the normally ineffective weights on the beam to render them effective at the rate of the desired weighing ratio, the means for setting and unsetting the weights including levers and rotatable circular cam disks, both levers and disks corresponding in number to the said weights, notches on the peripheries of the disks, the levers being arranged to bear against the peripheries of the disks and to engage the weights so as to set the weights, when, on rotation of the disks, the notches register with said levers.

2. In a weighing scale, a plurality of weighing beams connected with one another, a row of weights for every beam and arranged to be set on their corresponding beam, and means to set the normally ineffective weights on the beams to render them effective at the rate for securing the desired weighing ratio.

3. In a weighing scale, two interconnected weighing beams, two rows of weights for every beam and arranged to be set on their corresponding beams, and means to set the normally ineffective weights on the beams to render them effective at the rate for securing the desired weighing ratio.

In testimony whereof I have signed my name to this specification.

HEINRICH AUGUST ESSMANN.